O. JOHNSON.

Improvement in Combs.

No. 123,177.

Patented Jan. 30, 1872.

Witnesses:
Gustave Dieterich
Francis McArdle

Inventor:
O. Johnson
per Munn & Co.
Attorneys.

123,177

UNITED STATES PATENT OFFICE.

ORANGE JOHNSON, OF GRAND LODGE, MICHIGAN.

IMPROVEMENT IN COMBS.

Specification forming part of Letters Patent No. 123,177, dated January 30, 1872.

*To all whom it may concern:*

Be it known that I, ORANGE JOHNSON, of Grand Lodge, in the county of Eaton and State of Michigan, have invented a new and useful Improvement in Combs; and I do hereby declare that the following is a full, clear, and exact description thereof, which will enable others skilled in the art to make and use the same, reference being had to the accompanying drawing forming part of this specification.

The object of this invention is to so construct a comb that broken teeth may be removed and renewed; and it consists in making the plate of the comb with a rib and with screws for securing the teeth, the construction and arrangement being as hereinafter described.

Figure 1:
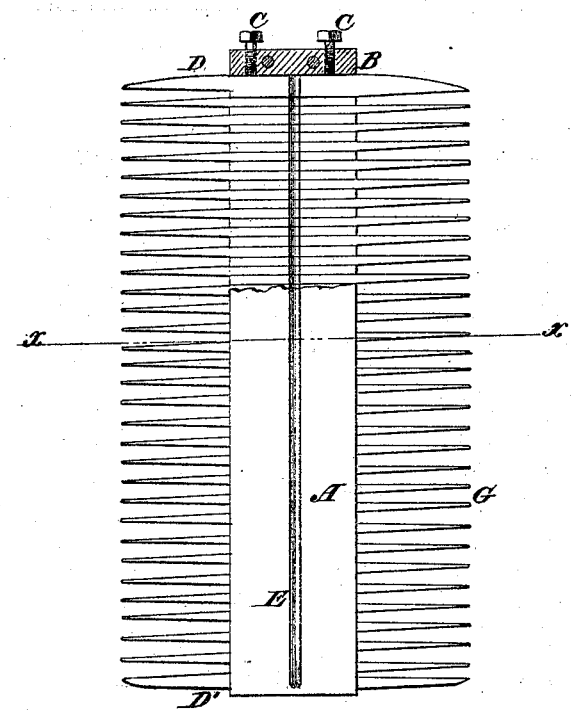
Figure 2:
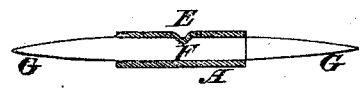

In the accompanying drawing, Figure 1 represents a side view of the comb, partly in section. Fig. 2 is a cross-section on the line $x\ x$ of Fig. 1.

Similar letters of reference indicate corresponding parts.

A is the plate of the comb, formed of a piece of sheet metal doubled, and confined together at the ends by a block or end piece, B, in which the screws C C work. D D' represent the end teeth, which extend entirely through, or which may be called double teeth. E is an indentation or groove in the outside of the plate, forming a rib, F, on the inside, as seen in Fig. 2. G represents the intermediate teeth, which extend from one edge of the plate with a tapering end or point, but with the other end flush with the edge of the plate. The arrangement of the intermediate teeth is seen in the sectional portion of Fig. 1. The butt-end of each tooth is notched to fit the rib E. This rib prevents the tooth from slipping out. When the screws are loosened the sides of the plate will spring or spread apart sufficiently to allow the teeth to be removed or inserted anywhere near the middle of the comb, from which point they may be slipped in either direction. The screws C C, one or more, work through the end piece B, with their ends against the end tooth D, thus pressing the teeth together and keeping them in the plate. The teeth may be made of wood, metal, or ivory, or of any other suitable material. When a tooth breaks the screws may be loosened and a new tooth put in its place. This comb is adapted for most of the purposes for which combs are used, being made of any size or proportions. The intermediate teeth may be made with double points and similar to the end teeth; but I prefer the arrangement shown in the drawing.

Having thus described my invention, I claim as new and desire to secure by Letters Patent—

In combination with independent teeth D G D' and set-screws C, a sheet-metal plate, A, doubled upon a block, B, and ribbed at F on the inner side, to hold said teeth, in the manner described.

ORANGE JOHNSON.

Witnesses:
    CHESTER H. SMITH,
    SAMUEL CHADWICK.